July 14, 1964  E. G. STACK  3,140,516
METHOD OF MANUFACTURING BOW-SHAPED PANELS
Filed Dec. 23, 1960  2 Sheets-Sheet 1

Emmett G. Stack
Inventor

July 14, 1964  E. G. STACK  3,140,516
METHOD OF MANUFACTURING BOW-SHAPED PANELS
Filed Dec. 23, 1960  2 Sheets-Sheet 2

3,140,516
METHOD OF MANUFACTURING
BOW-SHAPED PANELS
Emmet G. Stack, 1000 SW. Vista, Portland, Oreg.
Filed Dec. 23, 1960, Ser. No. 77,965
2 Claims. (Cl. 20—15)

My invention relates to the method of manufacturing the bow-shaped panels shown and described in Patent 2,700,192, issued to me on January 25, 1955.

The principal objective of this invention is to produce the bow-shaped panel on a production line basis.

Another objective is to produce this bow-shaped panel more accurately, more uniformly, and at much less cost.

A still further object is to accomplish the above objectives while using much of the equipment used every day in every plywood plant.

Figure 1:
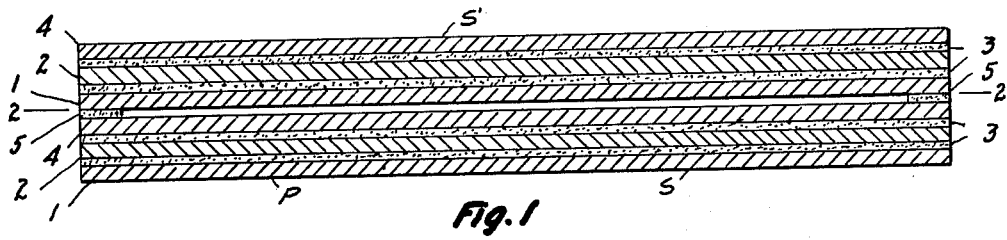
Figure 2:
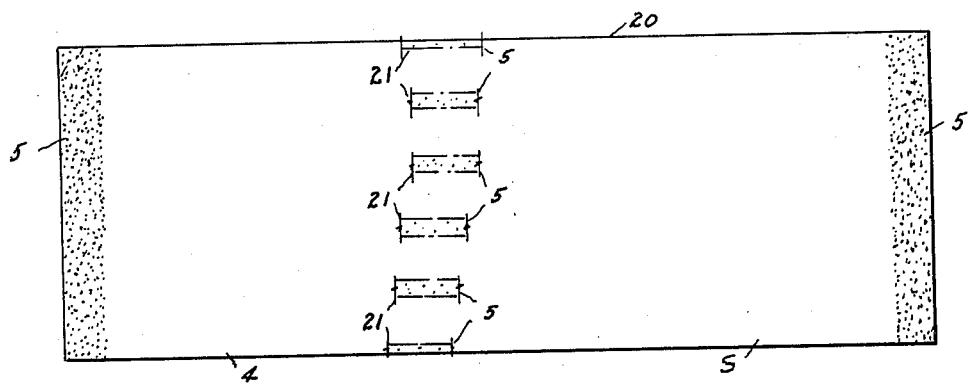
Figures 3, 4:
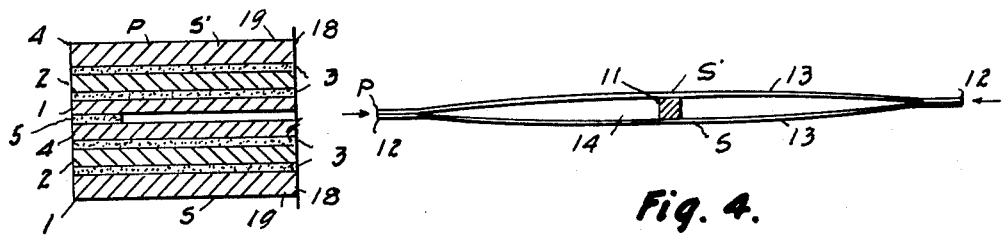
Figure 5:
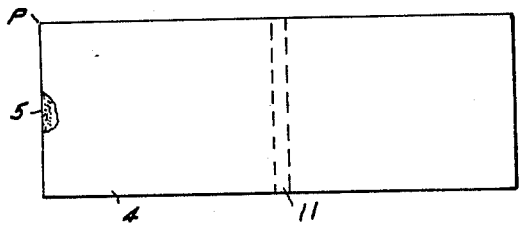
Figure 6:
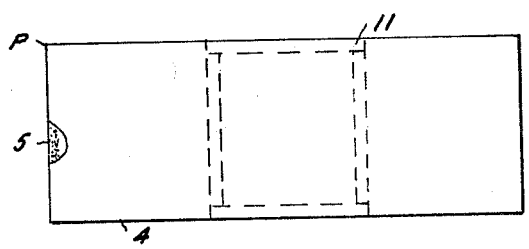
Figure 7:
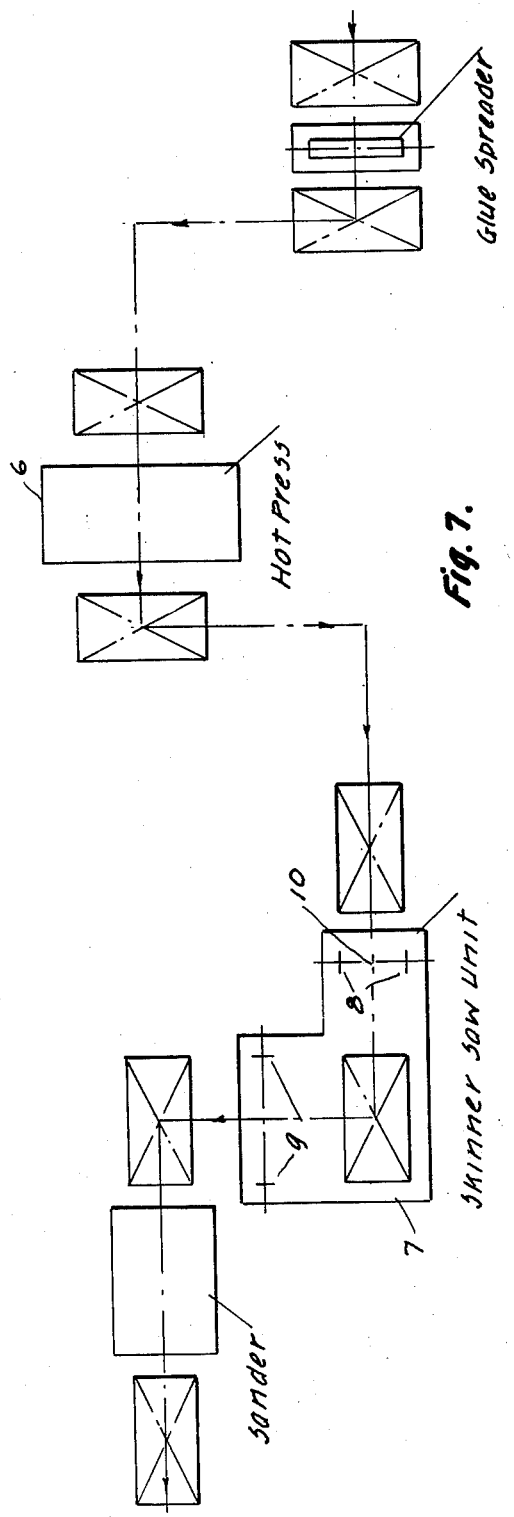
Figure 8:
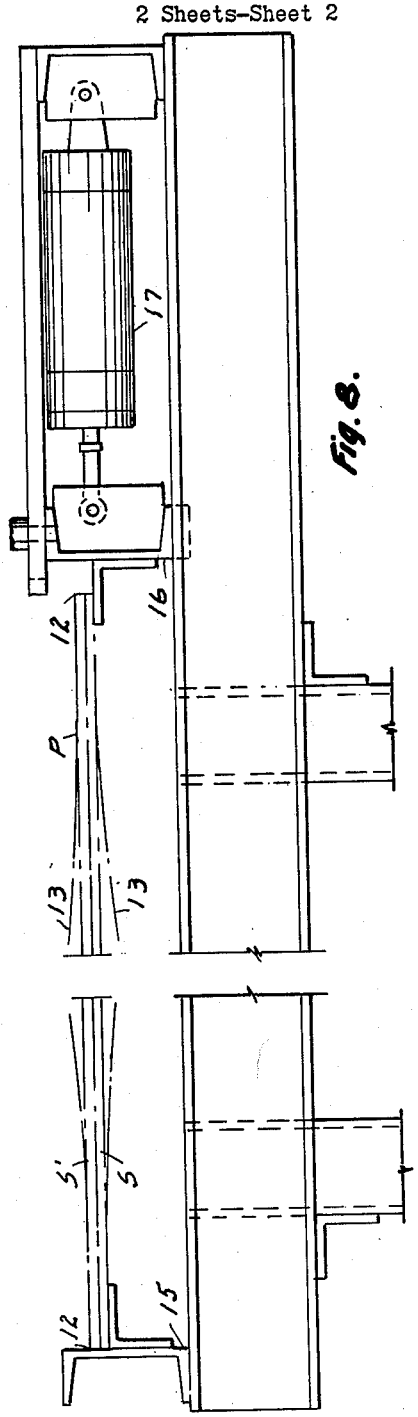

How the above enumerated objectives are accomplished is shown in the accompanying drawings in which FIG. 1 is an exaggerated section through a panel ready for insertion in a hot or cold press, FIG. 2 is a plan view on the line 2—2 of FIG. 1, showing the disposition of glue on this plane, FIG. 3 shows an exaggerated partial section of two unbalanced sheets of plywood incorporated in a balanced sheet, FIG. 4 is an end view of a finished panel, FIG. 5 shows a panel with a single spacer, FIG. 6 shows a panel with two spaced spacers, FIG. 7 shows the flow line from the panel layup at the glue spreader to the sander, FIG. 8 shows a cylinder-operated means for spreading the panel members apart by applying end pressure thereto.

Throughout the drawings and the specifications similar numerals refer to similar parts.

The bow-shaped panels described as grain door sections in Patent 2,700,192, have many other uses such as building panels, both vertical and horizontal, house doors, garage doors, and louver doors. These may be considered similar structures. The plywood, hardboard, or other sheet material used for the cover sheets may vary in thickness as may the spacers or spreaders positioned between them. These spacers or spreaders may be pre-formed and/or pre-assembled.

The bow-shape panel (FIG. 4) may be fabricated and assembled in many ways. In the small shop a single workman must perform dozens of operations to complete a unit. In larger shops huge presses may be used equipped with formers and heated platens. This is also too slow.

In woodworking plants the usual procedure is to buy commercial plywood and cut it up with the least amount of waste into the desired sizes before making up the panel. This is a costly procedure since costs are pyramided and operations duplicated. For instance the sandwich of each sheet of commercial plywood is first laid up, then pressed and the adhesive set after which the sandwich is edged and trimmed.

In my invention a plywood sandwich S is laid up in the usual manner by first laying down the face sheet 1, then the core or crossband 2 which has an adhesive 3 covering both sides thereof, and finally the second face sheet 4. When the first sandwich or S is laid up an adhesive 5 is spread on each end (see FIGS. 1, 2 and 3) for a pre-determined distance after which a second sandwich as S' is built up on the sandwich S as previously described and shown in the above mentioned figures. The sandwich unit comprising S and S' is fed into and out of the hot press 6 and then through a skinner saw unit 7 as a unit. This skinner saw unit 7 usually employs but two rip saws 8 and two trim saws 9 when sizing commercial plywood sheets. If grain doors were built a third saw as 10, shown dotted, is placed on the edger arbor so that two regular size door sections can be ripped from a 4' wide commercial sheet of plywood. If louver door panels were being made six edger saws might be placed upon the edger arbor and five panels ripped from a 4' sheet of commercial plywood at one pass and the same five panels trimmed in the same time required for a 4' wide panel.

As a matter of fact it requires but a few seconds more of total time to layup and put through the press and skinner saws five louver door panels than it does one 4' wide sheet of commercial plywood. The handling costs would be approximately the same in either case.

Some building and door panels require sanding in which case the panels from the trim saws go to the sander.

It is evident that each of the type of panels being manufactured will always be uniform and accurately made. Cost savings are apparent.

The panels may be shipped as they come from either the trim saws or the sander and the spacers or spreaders 11 may be inserted in the panels at some point distant from the place of manufacture of either. As a consequence minimum freight costs may be had.

Regardless of where they are inserted or what type of spacer or spreader is used end pressure is applied to the panel P as at 12 which causes each panel member 13 to bow outwardly and away from each other thus providing a space 14 between them for the reception of the spreader 11 used to hold said panel members apart. A stop and guide (not shown) may be provided to position the spacers or spreaders 11. The squeeze on the spacer or spreader 11 by the panel members 13 as they tend to straighten out usually is sufficient to hold the spacer or spreader 11 in place. In some instances it may be desired to add glue, nails, or staples. Where only a few assemblies are made carpenter clamps may be used to apply the end pressure. Where many are assembled the panel P is squeezed between the stop 15 and the pressure bar 16 to which pressure is applied by the cylinders 17 operated hydraulically or by air. The more or less diagrammatic drawing shown in FIG. 8 should be sufficient for those skilled in the art.

Other advantages that may accrue from my method of manufacture follow:

For instance, plywood manufacturers try to produce a balanced sheet for only a balanced sheet will stay straight. My method permits two unbalanced sheets of plywood to be layed up if desired and glued together into a balanced unit. In other words a thicker face sheet 19 of a better grade may be used for those sheets furthest from the neutral axis of the grain door unit. As a consequence a stronger but thinner unit may be had for a given condition. See FIG. 3.

Note is made that when two plywood sheets are glued together at opposite sides and spread apart to arch them increasing the thickness of the spacer or spreader increases the strength of the panel. Such a structure provides two arched sheets one arched sheet serving as the haunches of the other arched sheet.

Where the loads and stresses are heavy, as in grain door sections, a 4" flat glue area has proved sufficient in practice. In house doors this glue area may be only 2" wide so as to leave a 2" flat surface for the reception of a surface lockset and half surface butts. A 1" wide glue area is ample and gives a finished appearance to louver door panels.

As is known to all skilled in the art most hot presses in use today are built to take a 4' x 8' sheet of plywood. It is also known to those skilled in the art that house doors vary in size from 2/4 x 6/0 to 4/0 x 8/0 and that locksets and butts are always positioned adjacent the door side jambs. It follows that only one house door sandwich can be layed up at one time in the ordinary press and that the adhesive 5 will be spread along the long side 20 of the unit (instead of the short side thereof as shown in FIG. 2) so as to provide the flat area for the lockset and butts adjacent the door side jambs.

Vertical louver doors may be used to close the same door openings although a plurality of narrow panels are required to close the opening.

In my co-pending application for Vertical Louver Doors, Ser. No. 75,021 filed December 9, 1960, now abandoned, it was noted that five panels 8⅜" wide can be ripped from a 4' wide sheet of commercial plywood with a minimum of waste.

In laying up a 4' wide sandwich unit to be later ripped into these five panels six narrow strips (indicated by the numeral 21 in FIG. 2) of a predetermined width of the adhesive 5 are spread on the sandwich S parallel to the long side 20 so that the sandwiches S and S' will be bonded together along these strips of adhesive. These strips of adhesive 5 are spaced apart to provide the panels desired whose opposite sides parallel to 20 are bonded together over the area desired.

I do not limit my invention to the exact disclosure but extend it to all that comes fairly within the scope of the appended claims, because:

In carrying out my method of manufacturing the bow-shaped panel of Patent 2,700,192, equipment and its arrangement may vary without departing from the basic idea of laying up a unit of veneers in the prescribed manner, putting said unit through the press and skinner saws and finally spreading the panels coming from the skinner saws to insert a spacer between the spread-apart portions to provide the desired shape.

I claim:
1. A bow-shaped panel which comprises an adhesive, a pair of oppositely disposed sandwiches each built up of a desired number of plies of veneer, said sandwiches being secured together at two opposite ends thereof by the adhesive to leave that portion of each sandwich intermediate the adhesive free to be bowed outwardly and held away from each other, the outermost veneer ply of each sandwich being of greater thickness than the innermost veneer ply thereof when the two sandwiches are secured together, and a means adapted to hold the bowed portions of the sandwiches apart.

2. The method of manufacturing the bow-shaped panel set forth in claim 1 which includes laying up a sandwich of a desired number of plies of veneer with an adhesive covering adjacent faces of adjacent plies, the first ply being thicker than the last ply, spreading an adhesive on two opposite edge portions of the sandwich, laying up a second sandwich on the first sandwich but with the last ply thereof being thicker than the first ply, applying pressure to both sandwiches at the same time to bond their plies together and the sandwiches to each other to form a unit, edging and trimming said unit to panel size, bowing the unglued portions of each sandwich outwardly and away from each other, and inserting a spreader therebetween to hold them apart.

References Cited in the file of this patent
UNITED STATES PATENTS

| | | |
|---|---|---|
| 2,622,999 | Faussner | Dec. 23, 1952 |
| 2,700,192 | Stack | Jan. 25, 1955 |

FOREIGN PATENTS

| | | |
|---|---|---|
| 575,032 | Great Britain | Jan. 31, 1946 |
| 590,396 | Great Britain | July 16, 1947 |
| 625,036 | Great Britain | June 21, 1949 |
| 147,040 | Australia | June 25, 1952 |